(12) United States Patent
Nishino et al.

(10) Patent No.: US 8,129,045 B2
(45) Date of Patent: Mar. 6, 2012

(54) ELECTROCHEMICAL ELEMENT

(75) Inventors: Hajime Nishino, Nara (JP); Tomomichi Ueda, Osaka (JP); Kyousuke Miyata, Osaka (JP); Mikinari Shimada, Osaka (JP)

(73) Assignee: Panasonic Corporation, Osaka (JP)

( * ) Notice: Subject to any disclaimer, the term of this patent is extended or adjusted under 35 U.S.C. 154(b) by 713 days.

(21) Appl. No.: 12/293,938

(22) PCT Filed: Mar. 29, 2007

(86) PCT No.: PCT/JP2007/056850
§ 371 (c)(1),
(2), (4) Date: Sep. 22, 2008

(87) PCT Pub. No.: WO2007/114245
PCT Pub. Date: Oct. 11, 2007

(65) Prior Publication Data
US 2009/0208820 A1 Aug. 20, 2009

(30) Foreign Application Priority Data
Mar. 30, 2006 (JP) .................................. 2006-094006

(51) Int. Cl.
*H01M 2/12* (2006.01)

(52) U.S. Cl. ............................. 429/53; 429/82; 429/174

(58) Field of Classification Search .................... 429/53, 429/82, 129, 130, 174
See application file for complete search history.

(56) References Cited

U.S. PATENT DOCUMENTS

| 5,688,294 A | * | 11/1997 | Mizuno et al. | ............. 429/174 X |
| 5,804,335 A | | 9/1998 | Kamauchi et al. | |
| 5,989,745 A | | 11/1999 | Kamauchi et al. | |
| 6,777,128 B2 | * | 8/2004 | Kim | ............................ 429/53 X |
| 7,691,530 B2 | * | 4/2010 | Kim et al. | ...................... 429/174 |

FOREIGN PATENT DOCUMENTS

| CN | 2338881 Y | 9/1999 |
| JP | 1-294355 | 11/1989 |
| JP | 8-153541 | 6/1996 |
| JP | 9-199114 | 7/1997 |
| JP | 9-259869 | 10/1997 |
| JP | 9-283111 | 10/1997 |
| JP | 2001-273932 | 10/2001 |
| JP | 2002-231314 | 8/2002 |

OTHER PUBLICATIONS

Chinese Office Action, w/ English translation thereof, issued in Chinese Patent Application No. CN 200780011661.2 dated Mar. 29, 2010.

* cited by examiner

*Primary Examiner* — Stephen J. Kalafut
(74) *Attorney, Agent, or Firm* — McDermott Will & Emery LLP

(57) ABSTRACT

To operate a safety mechanism normally even when an accident happens. For this object, an electrochemical element includes an exhaust valve that operates when an internal pressure in a casing 4 reaches a predetermined pressure to release gas occurring in the casing to the outside, and a perforated plate 2 having holes 5a and 5b, which is provided between an electrode group 3 and the exhaust valve. The area of the perforated plate 2 excluding the holes 5a and 5b is 20% or more and 50% or less of the area of the opening of the casing. The perforated plate 2 is adapted for electrically insulating the electrode group 3 from the sealing member 1.

13 Claims, 6 Drawing Sheets

ELECTROCHEMICAL ELEMENT

RELATED APPLICATIONS

This application is the U.S. National Phase under 35 U.S.C. §371 of International Application No. PCT/JP2007/056850, filed on Mar. 29, 2007, which in turn claims the benefit of Japanese Application No. 2006-094006, filed on Mar. 30, 2006, the disclosures of which Applications are incorporated by reference herein.

TECHNICAL FIELD

The present invention relates to a sealed type electrochemical element, and in more detail, to a technology of allowing an exhaust valve to effectively operate even when the internal pressure rapidly rises at the time of gas occurrence inside an electrochemical element.

BACKGROUND ART

In electrochemical elements, particularly in nonaqueous electrolytic secondary batteries that are chargeable and dischargeable and have a high energy density, introduction of novel high capacity active materials has been vigorously studied to further increase the energy density. As a specific example, there is development of active materials from lithium-cobalt oxide to lithium-nickel oxide for positive electrode, and from graphite to alloy materials including silicon, tin, and the like for negative electrode.

Usual nonaqueous electrolytic secondary battery using these active materials have a sealed structure in which a positive electrode and a negative electrode are usually laminated with a separator being placed therebetween to thereby constitute an electrode group, and after the electrode group is housed in a casing, an opening of the casing is sealed with a sealing member. In a case of employing such a sealed structure, the following two safety mechanisms are provided. First, in order to exhaust to the outside of the casing gas occurring at an accidental incident such as internal short-circuiting or high-temperature storage, for example, the sealing member is formed with an exhaust valve that operates when the internal pressure inside the casing reaches a predetermined pressure. Second, because a terminal provided on the sealing member is electrically connected to either one of the positive electrode and the negative electrode, and the casing is electrically connected to the other electrode, not only the sealing member is electrically insulated from the casing, but also both are electrically insulated from each other by disposing a perforated plate between the electrode group and the sealing member (for example, refer to Patent Document 1). The perforated plate is formed of, for example, a polyolefin resin such as a polyethylene resin or a polypropylene resin, or a phenol resin including an inorganic additive with a glass cloth serving as a base material, and the like.
Patent Document 1: Japanese Unexamined Patent Publication No. 2002-231314)

However, because the above-mentioned high-capacity active materials have a high potential, the quantity and rate of gas occurring at an accidental incident are considerable. Additionally, in a nonaqueous electrolytic secondary battery using these high-capacity active materials, a surplus volume inside the casing is reduced as small as possible in many cases in order to further increase the energy density, which causes the problem that if gas occurs forcibly, it is difficult to smoothly exhaust the gas to the outside of the casing due to a limited passage to the exhaust valve.

DISCLOSURE OF THE INVENTION

The present invention has been achieved in consideration of the above-mentioned problems, and an object of the present invention is to optimize an internal structure of a casing in the process of manufacturing an electrochemical element such as a nonaqueous electrolytic secondary battery having a high energy density in a sealed structure, thereby assuring the safety mechanism to normally operate even when an accident happens.

In order to achieve the above-mentioned object, the inventors have made an attempt to analyze the main cause that the safety mechanism does not normally operate when gas rapidly occurs inside the casing when an accident happens. Consequently, it has been revealed that, when the internal pressure rapidly rises in the casing, a perforated plate randomly provided between the electrode group and the sealing member is deformed, which leads to deformation in the vicinity of the exhaust valve formed in the sealing member, and therefore, it is impossible for the gas to reach the exhaust valve, which results in a reduction in the exhaust efficiency. The present invention has been worked out from the analysis.

Specifically, the present invention is an electrochemical element in which an electrode group including a positive electrode, a negative electrode, and a separator placed between them is housed in a casing formed with an opening, and in which the opening of the casing is sealed with a sealing member, the electrochemical element including an exhaust valve that operates when an internal pressure in the casing reaches a predetermined pressure to release occurring gas in the casing to the outside, and a perforated plate having a hole and provided between the electrode group and the exhaust valve, and the area of the perforated plate excluding the hole is 20 to 50% of the area of the opening.

BEST MODE FOR CARRYING OUT THE INVENTION

Hereinafter, a best mode for carrying out the present invention will be described in detail with reference to the drawings.

An electrochemical element according to an embodiment of the present invention is an electrochemical element in which an electrode group including a positive electrode, a negative electrode, and a separator placed between them is housed in a casing, and in which an opening of the casing is sealed with a sealing member. There are provided an exhaust valve which is put into operation when the internal pressure in the casing reaches a predetermined pressure, thereby releasing gas occurring in the casing to the outside, and a perforated plate disposed between the electrode group and the exhaust valve. Hereinafter, a specific structure of the electrochemical element according to the present embodiment will be described.

Figure 1:
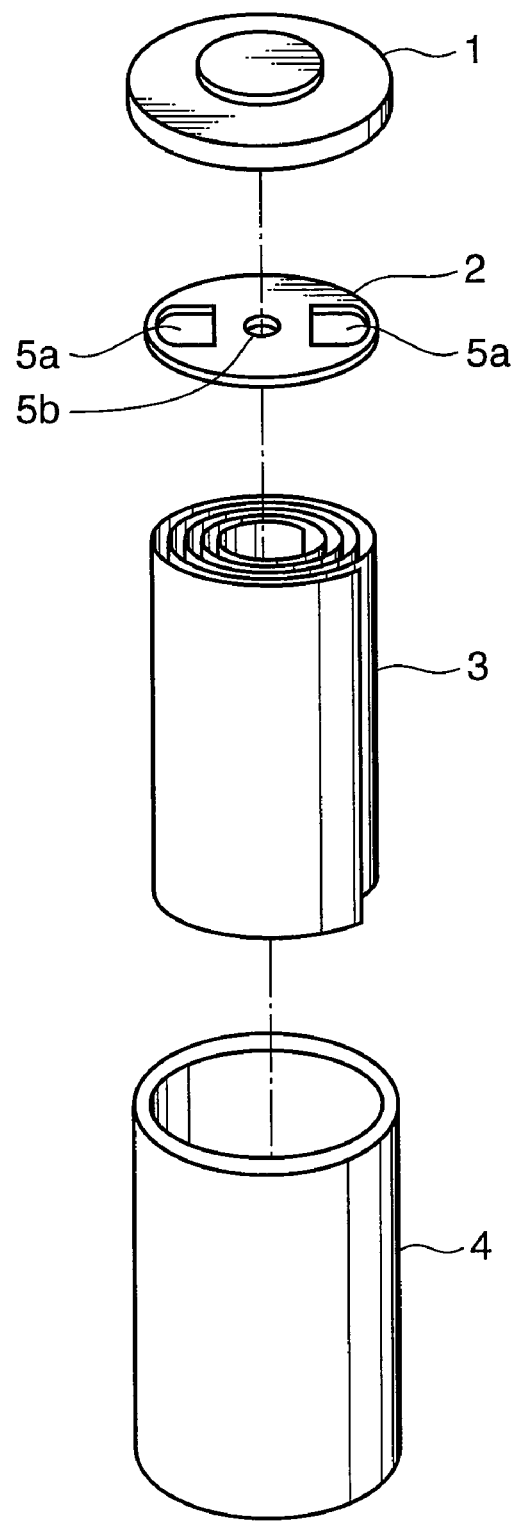
FIG. 1 is a schematic diagram showing a structure of an electrochemical element according to an embodiment of the present invention.
Figure 2:
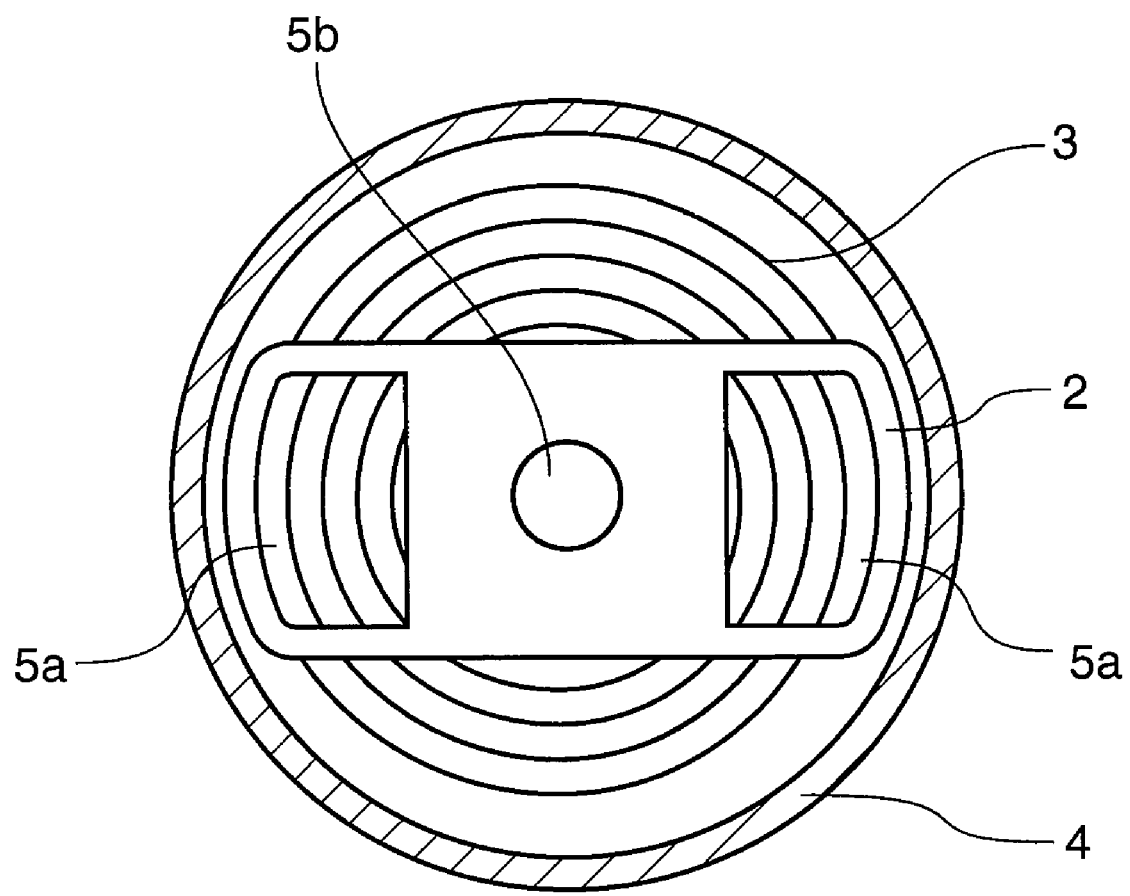
FIG. 2 is a schematic diagram showing a construction viewed from an opening of a casing before sealing it with a sealing member.
Figure 3:
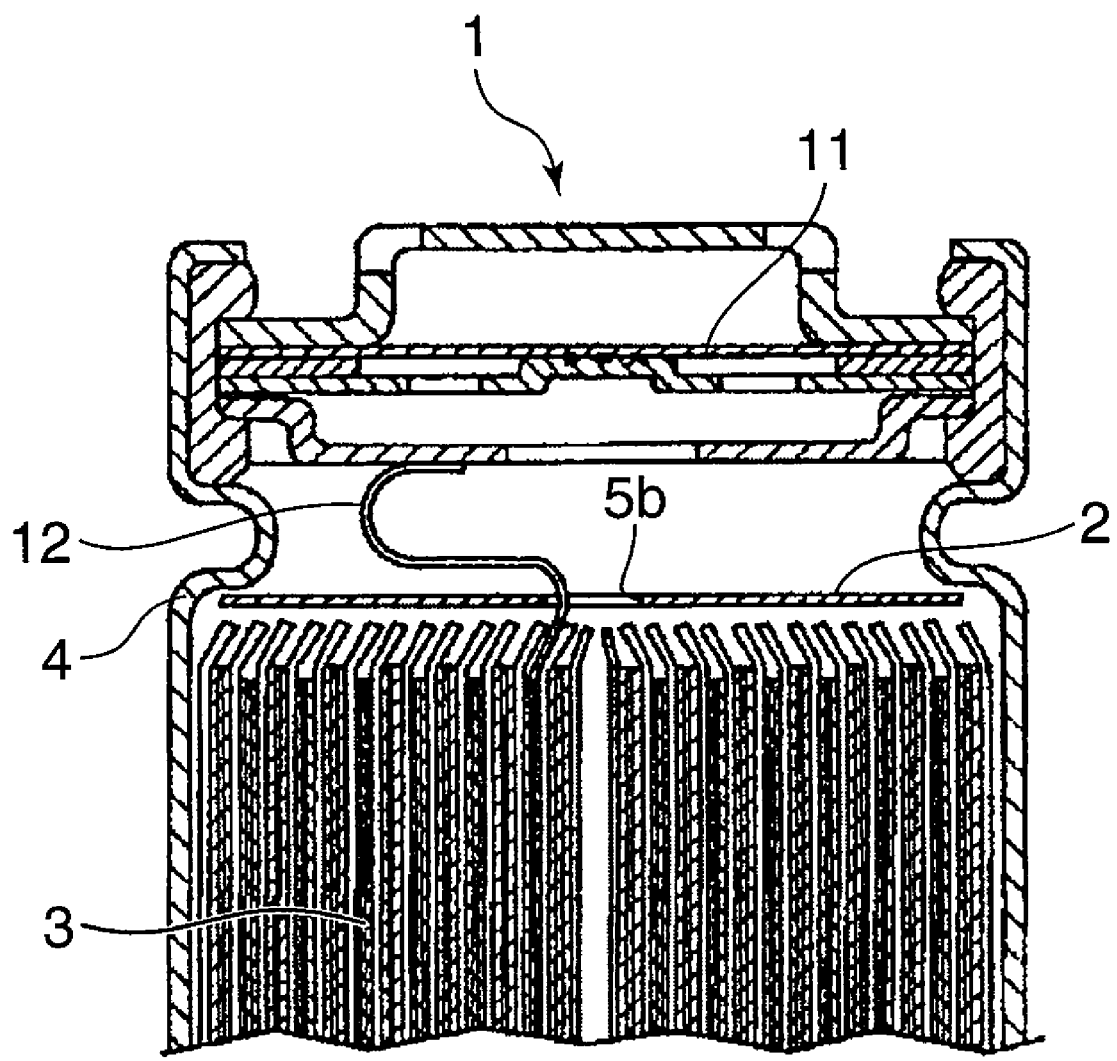
FIG. 3 is a longitudinally sectional view showing a part of the electrochemical element.

FIG. 1 is a schematic diagram showing the electrochemical element according to the present embodiment, and FIG. 2 is a schematic diagram showing a construction viewed from the opening of the casing before sealing it with the sealing member. FIG. 3 is a longitudinally sectional view showing a part of the electrochemical element.

An electrode group 3 and a perforated plate 2 are housed in a casing 4. The electrode group 3 includes a positive electrode strip, a negative electrode strip, and a separator strip placed between them, they being rolled spirally. After the electrode group 3 is housed in the casing 4, the perforated plate 2 is disposed above the perforated plate 2, and the opening at the upper end of the casing is sealed with a sealing member 1, consequently producing an electrochemical element according to the present embodiment. Further, as shown in FIG. 3, a positive electrode lead 12 extending from the top of the electrode group 3 is inserted through a hole 5b of the perforated plate 2 which will be described later to be welded to the sealing member 1.

The perforated plate 2 is disposed between the electrode group 3 and the sealing member 1. The perforated plate 2 may be shaped into a disk having a diameter slightly smaller than the sealing member 1 as shown in FIG. 1, alternatively, as shown in FIG. 2, may be shaped into an elongate plate having round both ends. Further, the perforated plate 2 may be shaped into other from than these.

The perforated plate 2 having any shape is formed with a hole. In the present embodiment, first holes 5a and a second hole 5b are formed therein. The second hole 5b is, for example, a circular through-hole, and is formed in a center of the perforated plate 2. The second hole 5b is coaxial with a center of the electrode group 3. The first holes 5a are through-holes, and formed in the opposite sides of the second hole 5b in such a way as to sandwich the second hole 5b. The first holes 5a have a shape symmetrical to each other.

The first holes 5a and the second hole 5b serve as escape holes for gas rapidly occurring in the casing 4 when an accident happens. Therefore, the gas is smoothly guided to an exhaust valve 11 provided on the sealing member 1. Moreover, an area of the perforated plate 2 excluding the first holes 5a and the second hole 5b is made to be equal to or greater than 20% and equal to or less than 50% of the area of the opening of the casing 4. Accordingly, the gas rapidly occurring when an accident happens can be steadily guided to the exhaust valve 11 and the electrical insulation between the electrode group 3 and the sealing member 1 can be firmly retained at the necessary mechanical strength.

Here, a ratio of the area of the perforated plate 2 excluding the first holes 5a and the second hole 5b with respect to the area of the opening of the casing is defined as a perforated plate area ratio. Namely, the perforated plate area ratio represents a percentage of the area of blocking off gas against the area of the opening. In the case where the perforated plate area ratio is less than 20%, there is likelihood that the perforated plate 2 is broken when the electrochemical element receives an impact caused by a fall, for example. Therefore, in the case where the perforated plate area ratio is less than 20%, there is the likelihood that the electrical insulation between the electrode group 3 and the sealing member 1 cannot be retained. In contrast thereto, in the case where the perforated plate area ratio is over 50%, there is insufficient space for flowing accidentally rapidly occurring gas to the exhaust valve 11, consequently causing a deformation of the perforated plate 2.

Further, it may be possible to dispose an insulating member between the electrode group 3 and the sealing member 1 in addition to the perforated plate 2. However, in this case, the space for accidentally occurring gas must not be blocked by the insulating member. Therefore, it is necessary for the insulating member to have a mechanical strength greater lower than that of the perforated plate 2 or to have holes having the same area as the perforated plate 2.

The position and the shape of the first holes 5a and the second hole 5b in the perforated plate 2 may be selectably determined. Further, FIG. 2 shows the structure in which the first holes 5a and the second hole 5b are formed. However, both the first holes 5a and the second hole 5b are not necessarily required. However, in the case of a usual electrochemical element, battery electrolyte is injected in the casing immediately before sealing the opening with the sealing member 1. Accordingly, considering the injection of battery electrolyte, it is preferable to form the hole 5b in substantially the center. Further, with respect to the first holes 5a, there is no need to form the two necessarily. For example, a single first hole 5a may be formed, the single first hole 5a extending along a circumference around the second hole 5b. In this case, the single first hole 5a may be preferably extended a half or more of the circumference. Further, it may be appreciated to form three or more first holes 5a.

The perforated plate 2 is made to preferably have such a thickness as to provide a sufficient mechanical strength and as not to cause an energy density reduction. Specifically, for an electrochemical element having a capacity of 3.0 Ah or less, the thickness of the perforated plate 2 is preferably within a range of 0.2 to 1.0 mm. This optimum range may be suitably changed in proportion to the capacity of an electrochemical element.

The aforementioned "opening" is substantially synonymous with an inner diameter of the casing 4. Specifically, after the electrode group 3 and the perforated plate 2 are housed in the casing 4, the sealing is carried out by narrowing the diameter of an upper portion of the casing 4 as a pretreatment, and disposing the sealing member 1 on it, and caulking the portion. Herein, the "opening" means an opening which is not after narrowing, but before narrowing the upper portion of the casing, and has the same diameter as an inner diameter of a portion other than the upper portion of the casing 4.

Further, in the present embodiment, the exhaust valve 11 is exemplarily shown to be provided inside of the sealing member 1. However, the present invention is not limited to this. For example, in a battery having an electrode group 3 whose axis is on a direction different from the sealing member 1, an exhaust valve may not be provided inside of a sealing member. Even in this case, however, a perforated plate 2 is disposed between the electrode group and the exhaust valve.

The perforated plate 2 is adapted for electrically insulating the electrode group 3 from the sealing member 1. Accordingly, the above-mentioned insulating member is not required. In order for the perforated plate 2 to have an insulating function, for example, the perforated plate 2 may be made of a hard insulating material. As the hard insulating material, for example, may be used a heat resistant resin such as Bakelite, a glass fiber reinforced resin such as glass-phenol, reinforced plastic.

Further, in order for the perforated plate 2 to have an insulating function, the perforated plate 2 may be a metal plate provided with an insulating material on at least one surface thereof. In the case where the perforated plate 2 is made of a hard insulating material, molding is hard and expensive. For the perforated plate 2, therefore, the use of a metal plate provided with an insulating material on at least one surface thereof makes it possible to produce the perforated plate 2 having the sufficient strength and insulating performance at a reduced cost.

As a specific structure in which an insulating material is provided on at least one surface of a metal plate, there may be a structure in which a resin material such as polypropylene or polyethylene is adhered onto at least one surface of a metal plate such as SUS or iron, a structure in which an insulating paint is applied to a metal plate so as to make a coat layer, and the like. The coat layer is made by spray coating, dipping, and the like. In order to assure maintaining of electrical insulation between the electrode group 3 and the sealing member 1, insulating material may be most preferably provided on both surfaces of a metal plate. In the casing where insulating material is provided on only one surface of a metal plate, considering the possibility that the metal plate dissolves at the potential of the positive electrode, the lower surface of the sealing member 1 that is to come into contact with the positive electrode is preferably arranged so as to face the surface on which the insulating material is provided. Further, since there are some occasions that the holes 5a and 5b of the perforated plate 2 are utilized as holes for passing a collecting lead of a positive electrode or a negative electrode, it is preferable to provide insulating material on the inner surface of the hole formed in the metal plate.

In a battery in which the axis of the electrode group 3 is on a direction different from the direction of the sealing member 1, for example, the perforated plate 2 may provided with a function of electrically insulating the electrode group 3 from the casing 4. As a specific structure of the perforated plate in this case, the perforated plate 2 itself is made of a hard insulating material, or the perforated plate 2 is a metal plate provided with an insulating material on at least one surface.

The positive electrode includes a lithium-nickel composite oxide as an active material. In the case where the electrochemical element is a nonaqueous electrolytic secondary battery, a lithium-cobalt composite oxide ($LiCo_{1-x}M_xO_2$, where M is an arbitrary metallic element, $0 \leq x < 1$), a lithium-manganese composite oxide ($LiMn_{1-x}M_xO_2$ or $LiMn_{2-x}M_xO_4$, where M is an arbitrary metallic element, $0 \leq x < 1$), or the like are used. Among these, a lithium-nickel composite oxide ($LiNi_{1-x}M_xO_2$, where M is an arbitrary metallic element, $0 \leq x < 1$) is likely to cause considerably much quantity of gas when an accident happens. However, the provision of the perforated plate 2 can steadily guide the accidentally occurring gas to the exhaust valve.

As described above, the electrode group 3 has the roll structure into which the positive electrode strip, the negative electrode, and the separator strip placed between them are together wound. However, the electrode group 3 may have a multilayer laminated structure in which positive electrode plate pieces, negative electrode plate pieces, and separator plate pieces are stacked over one another. The gaps inside the electrode group 3 of the roll structure extend only in the vertical direction of the casing 4. Accordingly, the accidentally occurring gas does not diffuse in a transverse direction, but goes to the sealing member 1. Therefore, the roll structure enhances the advantageous effect of the perforated plate 2. The roll structure for the electrode group 3 may be cylindrical or rectangular. The both structures have the identical effect.

The perforated plate 2 is preferably configured so as not to close a passage having a maximum flow rate among the passages for gas coming from the electrode group 3. The smaller the ratio of closing the maximum flow passage is, the better the efficiency of exhausting gas is. In the cylindrical roll type battery, the maximum flow passage corresponds to a center space which is defined by taking out a winding core used for winding the electrode strips after completing the winding, or an inner hole of a center member (gas exhausting means) placed in the center space. The center member is placed in the center space in order to deal with a clogging likely to occur in the separator or the like when exhausting gas. The provision of the center member prevents clogging to thereby exhaust gas reliably. In the rectangular roll type battery, there are a space between the winding core and the electrode group, and a space between a corner of the casing and the electrode group, or the like.

Figure 4:
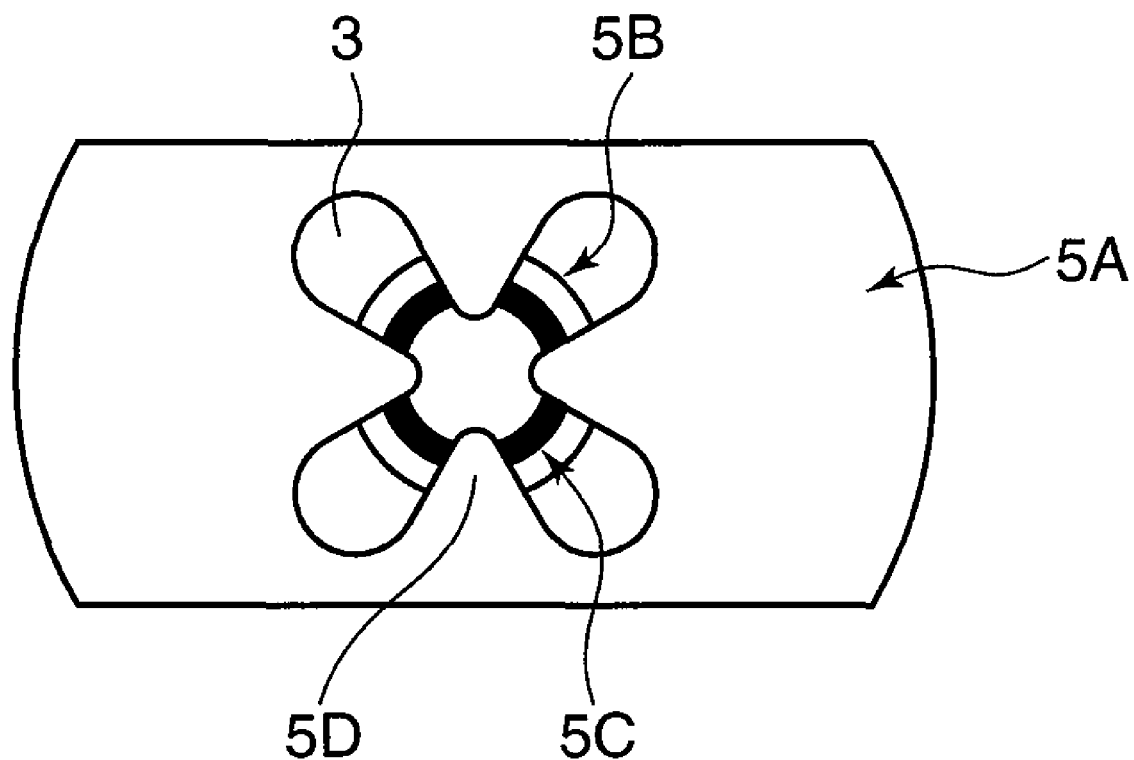
FIG. 4 is a diagram showing a perforated plate, and a center space and a center member of an electrode group as viewed from a location where an exhaust valve is provided.

Hereinafter, a relationship between the flow passage for exhausting gas and the electrode group in the case where the center member is installed inside the electrode group will be described with reference to FIG. 4. FIG. 4 is a diagram showing a perforated plate 5A viewed from the exhaust valve. As shown in FIG. 4, a center space 5B after the winding core is taken out is defined inside the electrode group 3, and a center member 5C is installed in the center space 5B. The center member 5C is cylindrical, and serves as a gas exhausting member having an inner hole. Therefore, gas exhausted from the bottom of the electrode group 3 passes through the inner hole of the center member 5C to go upward, and the gas is guided to the exhaust valve.

On a circumference of the hole formed in the center of the perforated plate 5A, protrusions 5D are provided in order to prevent the center member 5C from going out due to impact or the exhausting gas. The protrusion 5D preferably has an area as small as possible to suppress the closing of the flow of gas exhausted from the inner hole of the center member 5C or the center space 5B. However, if the protrusion 5D is too small, it is impossible to secure strength enough to hold down the center member 5C. Therefore, it is necessary to regulate the size of the protrusion 5D to some extent.

It is assumed that an inner circle area which is calculated from the inner diameter of the center space 5B, i.e., a sectional area of the center space 5B is S0, and an area of the parts of the protrusions 5D of the perforated plate 5A that protrude out the center space 5B in the view from the exhaust valve is S1. Namely, the area S1 is the area of the center space 5B that is closed by the protrusion 5D. Here, a center space opening area ratio R1 is calculated as the following equation (1):

$$R1=(S0-S1)/S0 \qquad (1).$$

Further, it is assumed that an inner circle area which is calculated from the inner diameter of the center member 5C, i.e., a sectional area of the inner hole is S2, and the area of the parts of the protrusions 5D of the perforated plate 5A which protrude out inward of the center member 5C in the viewed from the exhaust valve is S3. Namely, the area S3 is the inner space area of the center member 5c that is closed by the protrusion 5D. Here, a center member opening area ratio R2 is calculated as the following equation (2):

$$R2=(S2-S3)/S2 \qquad (2).$$

The center space opening area ratio R1 is preferably 0.45 or more. On the other hand, the center member opening area ratio R2 is preferably 0.3 or more. Provided that these ratios are within these ranges, the gas can be easily exhausted from the exhaust valve.

The structure of the electrochemical element or the nonaqueous electrolytic secondary battery will be described in more detail.

The positive electrode is formed with an agent combination layer on a base material such as an aluminum foil. The agent combination layer includes the above-mentioned active material, a conductive agent such as graphite or carbon black, a binding agent such as polyvinylidene fluoride (PVDF) or polytetrafluoroethylene, and a thickening agent such as carboxymethyl cellulose (CMC) according to need.

The negative electrode is formed with an agent combination layer on a base material such as a silver foil. The agent combination layer includes an active material such as a material capable of being alloyed with graphite or lithium, a conductive agent such as carbon nanofiber or carbon black according to need, a binding agent such as PVDF styrene-butadiene copolymer (SBR), and a thickening agent such as CMC according to need.

The separator includes a microporous film made of a polyolefin such as polyethylene or polypropylene. The battery electrolyte (nonaqueous electrolyte) includes a solution in which an electrolyte such as $LiPF_6$ or $LiBF_4$ is dissolved in a solvent serving as an elemental substance or mixture of a chain carbonate and/or a cyclic carbonate. The battery casing is made of iron or aluminum which is molded into a cylindrical or rectangular shape.

An exemplary nonaqueous electrolytic secondary battery will be described hereinafter. However, the electrochemical element of the present invention is not limited to this example.

Example

Negative Electrode 96 parts by weight of artificial graphite cake (trade name MAG-D manufactured by HITACHI CHEMICAL CO., LTD) serving as an active material, 3 parts by weight by a solid content ratio of SBR serving as a binding agent, 1 part by weight of CMC (manufactured by DAI-ICHI KOGYO SEIYAKU CO., LTD) serving as a thickening agent, and an appropriate amount of water were mixed by use of a planetary mixer to prepare a negative electrode combination paste. This paste was applied on both surfaces of a collector (whose thickness is 10 μm) made of a silver foil, and rolled under pressure after drying the same, and cut to thereby obtain a negative electrode (58 mm×600 mm, a thickness of 170 μm).

(Positive Electrode)

93 parts by weight of $LiCoO_2$ powder serving as an active material, and 4 parts by weight of acetylene black (AB) serving as a conductive agent were mixed. 3 parts by weight by a solid content ratio of PVDF or N-methyl-2-pyrolidone (NMP) solution (trade name #1320 manufactured by KUREHA CHEMICAL INDUSTRY CO., LTD) serving as a thickening agent was mixed with the obtained powder. An appropriate amount of NMP was mixed with the obtained mixture to prepare a positive electrode combination paste. This paste was applied on both surfaces of a collector (whose thickness is 15 μm) made of an aluminum foil, and was rolled under pressure after drying the same, and dehydrated thoroughly at 85° C. Thereafter, this was cut to obtain a positive electrode A (57 mm×550 mm, a thickness of 180 μm).

Except for that $LiCo_{0.2}Ni_{0.8}O_2$ was used as an active material, the active material applying quantity onto an aluminum foil was decreased, a gentle rolling was carried out, and a theoretical capacitance per a unit area and a thickness were regulated, further, a positive electrode B was produced in the same manner as the positive electrode A.

(Electrode Group)

The positive electrode A and the negative electrode were rolled about a winding core into a cylindrical shape with a separator (trade name#2320 whose thickness is 0.02 mm, manufactured by CELGARD CO., LTD) being placed between them. Thereafter, the winding core was taken out of the electrode group to thereby make an electrode group A having a diameter of 17.6 mm and a height of 60 mm (theoretical capacitance of 2550 mAh). In accordance therewith, there was a center space in the center of the electrode group. Further, an electrode group B was made in the same way as the electrode group A except for that the positive electrode A was replaced with the positive electrode B.

(Perforated Plate)

A perforated plate 2 having a design shown in FIG. 2 was produced by processing a glass-phenol plate (whose thickness is 0.5 mm) having a diameter of 18 mm. Then, seven perforated plates 2 were produced, one plate being formed with holes having a shape identical to another plate, but different size from another plate. Consequently, the seven perforated plates 2 have a hole-exclusive-area of 0.38 $cm^2$ (perforated plate A), 0.50 $cm^2$ (perforated plate B), 0.75 $cm^2$ (perforated plate C), 0.87 $cm^2$ (perforated plate D), 1.00 $cm^2$ (perforated plate E), 1.25 $cm^2$ (perforated plate F), and 1.38 $cm^2$ (perforated plate G), respectively. Further, perforated plates I, J, and K were produced, they having the same area of their respective first holes 5a as the perforated plate D, but having smaller areas of their respective second holes 5b than the perforated plate D, respectively. The hole-exclusive-areas of the perforated plates I, J, and K are respectively 0.87 $cm^2$, 0.99 $cm^2$, and 1.00 $cm^2$.

Further, an iron plate (whose thickness is 0.5 mm) having a diameter of 18 mm was formed with holes so as to have the same shape and the same area as the sample D. This perforated plate was spray-coated with an insulating material or fluorine resin at a thickness of 15 μm, thereby producing a perforated plate H.

(Nonaqueous Electrolytic Secondary Battery)

After the electrode group A was housed in a cylindrical casing made of iron and having a diameter of 18.30 mm and an inner diameter of 17.85 mm (an opening area of 2.50 $cm^2$), and a height of 68 mm, a negative electrode lead extending from a lower surface of the electrode group A was welded to a bottom surface of the casing. Thereafter, a center member serving as a gas exhausting member was inserted into a center space of the electrode group. At this time, the inner diameter of the center space of the electrode group was 3.5 mm, and the inner diameter of the center member was 2.8 mm. The thickness of the center member was 0.25 mm. Moreover, the perforated plate A (battery AA), the perforated plate B (battery AB), the perforated plate C (battery AC), the perforated plate D (battery AD), the perforated plate E (battery AE), the perforated plate F (battery AF), the perforated plate G (battery AG), the perforated plate H (battery AH), the perforated plate I (battery AI), the perforated plate J (battery AJ), and the perforated plate K (battery AK) were disposed above respective electrode groups A, and a positive electrode lead extending from an upper surface of the electrode group A was passed through a hole of the perforated plate, and welded to the sealing member. An exhaust valve whose operative pressure is 14.7 MPa was built in the sealing member.

On the other hand, after electrode groups B were respectively housed in casings identical to those of the batteries AA to AG, a negative electrode lead extending from a lower surface of the electrode group B was welded to a bottom surface of the casing. Moreover, the perforated plate A (battery BA), the perforated plate B (battery BB), the perforated plate C (battery BC), the perforated plate D (battery BD), the perforated plate E (battery BE), the perforated plate F (battery BF), the perforated plate G (battery BG), the perforated plate H (battery BH), the perforated plate I (battery BI), the perforated plate J (battery BJ), and the perforated plate K (battery BK) were disposed above the respective electrode groups B, and a positive electrode lead extending from an upper surface of the electrode group B was passed through a hole of the perforated plate, and welded to the sealing member. An exhaust valve whose operative pressure is 14.7 MPa was built in the sealing member.

After the diameter of an upper portion of the casing was reduced by machining, a nonaqueous electrolyte including $LiPF_6$ of 1.2 M dissolved in a mixture of nonaqueous solvent having ethylene carbonate (EC) and ethyl methyl carbonate (EMC) at 1:3 by volume ratio was injected, and a sealing member was disposed in the upper portion of the casing that was reduced, and the casing was sealed by caulking. In this way, nonaqueous electrolytic secondary batteries were completed. In these batteries, the batteries AB to AF, AH to AJ, BA to BF, and BH to BJ are inventive examples, and the batteries AA, AG, AK, BA, BG, and BK are comparative examples.

To these nonaqueous electrolytic secondary batteries, constant current charging of 500 mA at a final voltage of 4.1 V and constant current discharging of 500 mA at a final voltage of 3.0 V were conducted twice, and the following evaluations were carried out.

(Drop Test)

For each battery, twenty samples were picked up. After measurement of open circuit voltage was done for each sample, the sample was dropped from a height of 150 cm ten times, and measurement of open circuit voltage was thereafter done for the sample. A sample which had a open circuit voltage difference between before and after dropping of 20 mV or more was qualified as "Abnormal Voltage". The incidence rate of abnormal voltage is shown in Table 1.

(Observation of Difference of Gas Occurrence Way)

Figure 5:
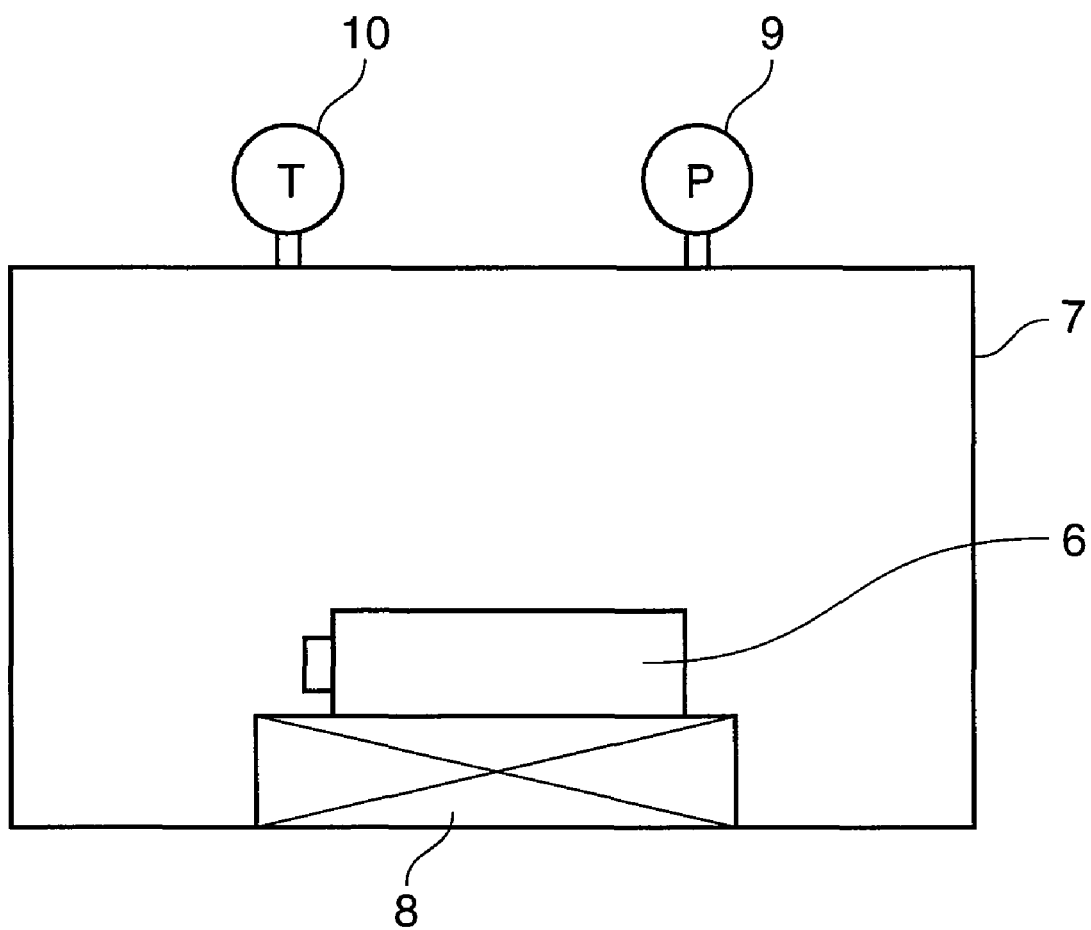
FIG. 5 is a schematic diagram for explanation of a measurement method for studying a gas occurrence way at a high temperature.

One sample for each of the batteries AD and BD was picked up, and constant current charging of 1500 mA at a final voltage of 4.2 V was carried out for the sample in an atmosphere at 25° C., and thereafter constant current discharging of 100 mA at a final voltage of 4.2 V was carried out. The sample was placed in a pressure resistant container shown in FIG. 5, and heated to 250° C. to thereby cause gas to rapidly occur under the forced conditions. Then, a change in the temperature and pressure inside of the pressure resistant container was measured.

Figure 6:
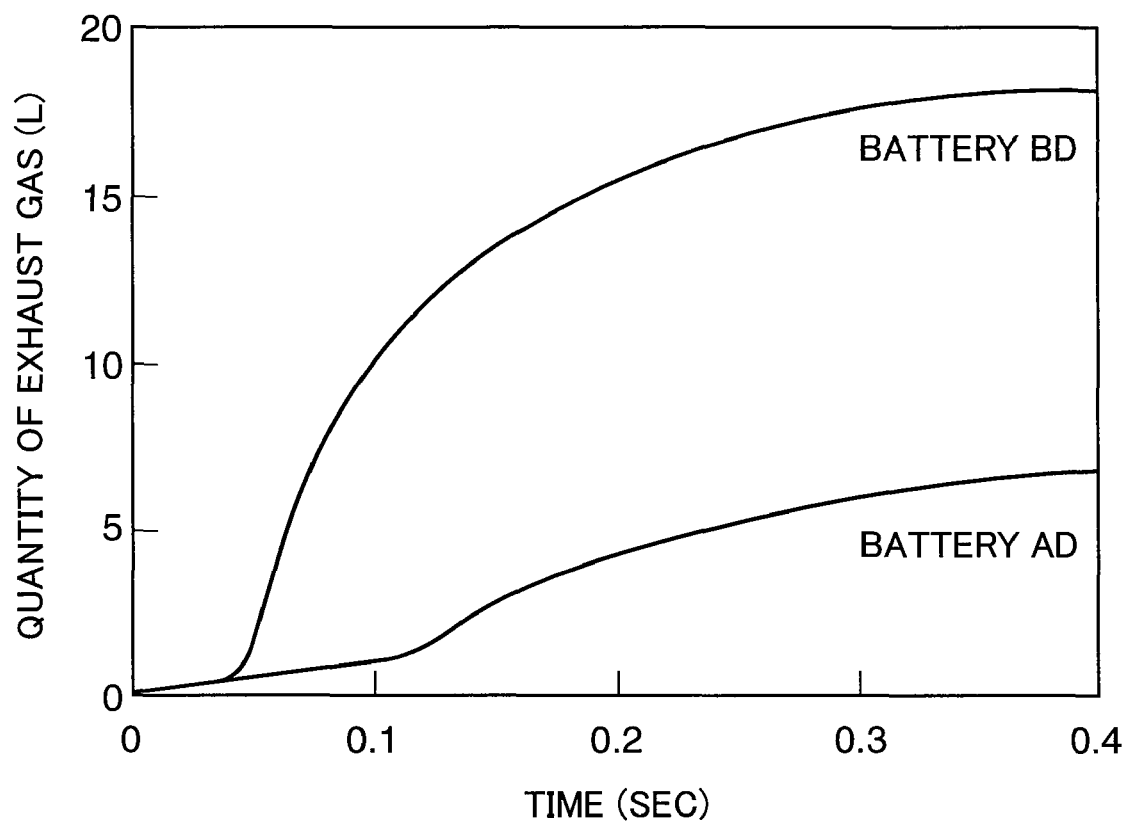
FIG. 6 is a characteristic diagram showing differences in the gas occurrence way at a high temperature due to different positive electrode active materials.

The detailed measurement manner is as follows. A battery 6 was placed in a chamber 7 having a heater 8, a pressure gauge 9, and a thermometer 10. The battery 6 was heated by the heater 8 to reach a temperature of 250° C., and kept at the constant high temperature. The exposure of the battery 6 to the high temperature of 250° C. causes the gas occurring in the battery 6 to flow out of the battery 6 (i.e., to the inside of the chamber 7) through the exhaust valve. Here, a change in the pressure and temperature inside of the chamber 7 that was obtained by the pressure gauge 9 and the thermometer 10 was converted into a quantity of exhaust gas at 20° C. by the use of an ideal gas state equation (PV=nRT, where P denotes a pressure, V denotes a volume, n denotes mole number of gas molecules, R denotes a constant number, and T denotes a temperature). FIG. 6 shows the integral quantity of the exhausted gas along the ordinate, while the elapsed time along the abscissa.

(Observation of Operation of Exhaust Valve for Gas Occurrence)

Twenty samples for each battery were picked up, and charging was carried out in the same manner as the "Observation of Difference of Gas Occurrence Way". Thereafter, the sample was placed in the pressure resistant container shown in FIG. 5, and thereafter the sample was heated to 250° C. to thereby cause gas to rapidly occur under the forced conditions. The sample was taken out of the pressure resistant container after the gas was released from the casing, and the appearance of the sample was observed. A sample which was observed to have discharged gas through the exhaust valve was qualified as "Acceptance". The results are shown in Table 1.

TABLE 1

| Battery | Electrode Group | Perforated Shape | Perforated Area ($cm^2$) | Opening Area ($cm^2$) | Perforated Board Area Ratio (%) | Center Member Opening Area Ratio (%) | Center Space Opening Area Ratio (%) | Incidence of Abnormal Voltage (%) | Acceptance Ratio of Exhaust Valve Operation (%) |
|---|---|---|---|---|---|---|---|---|---|
| AA | A | A | 0.38 | 2.50 | 15.2 | 95 | 61 | 70 | 100 |
| AB | | B | 0.50 | | 20.0 | 95 | 61 | 10 | 100 |
| AC | | C | 0.75 | | 30.0 | 95 | 61 | 5 | 100 |
| AD | | D | 0.87 | | 34.8 | 95 | 61 | 5 | 100 |
| AE | | E | 1.00 | | 40.0 | 95 | 61 | 0 | 95 |
| AF | | F | 1.25 | | 50.0 | 95 | 61 | 0 | 90 |
| AG | | G | 1.38 | | 55.1 | 95 | 61 | 0 | 80 |
| AH | | H | 0.87 | | 34.8 | 95 | 61 | 0 | 50 |
| AI | | I | 0.87 | | 34.8 | 95 | 61 | 5 | 100 |
| AJ | | J | 0.99 | | 39.5 | 47 | 30 | 5 | 100 |
| AK | | K | 1.00 | | 39.9 | 43 | 28 | 0 | 85 |
| BA | B | A | 0.38 | | 15.2 | 95 | 61 | 80 | 95 |
| BB | | B | 0.50 | | 20.0 | 95 | 61 | 10 | 95 |
| BC | | C | 0.75 | | 30.0 | 95 | 61 | 5 | 95 |
| BD | | D | 0.87 | | 34.8 | 95 | 61 | 0 | 95 |
| BE | | E | 1.00 | | 40.0 | 95 | 61 | 0 | 90 |
| BF | | F | 1.25 | | 50.0 | 95 | 61 | 0 | 85 |
| BG | | G | 1.38 | | 55.1 | 95 | 61 | 0 | 80 |
| BH | | H | 0.87 | | 34.8 | 95 | 61 | 5 | 30 |
| AI | | I | 0.87 | | 34.8 | 95 | 61 | 5 | 100 |
| AJ | | J | 0.99 | | 39.5 | 47 | 30 | 5 | 90 |
| AK | | K | 1.00 | | 39.9 | 43 | 28 | 0 | 80 |

As understood from Table 1, the incidence of abnormal voltage (internal short-circuit) rapidly increases in the case where the perforated plate area ratio comes to be 20% or less. By disassembling and observing the questioned batteries AA and BA, it was ascertained that the perforated plates were broken by impact caused by the drop, consequently making it impossible that the electrical insulation is maintained between the electrode group and the sealing member.

The center space opening area ratio and the center member opening area ratio are shown in Table 1. The center space opening area ratio is R1 which is calculated by the equation (1), and the center member opening area ratio is R2 which is calculated by the equation (2).

In the case where the center member opening area ratio R2 comes to be less than 45%, and the center space opening area ratio R1 comes to be less than 30%, the acceptance ratio of exhaust valve operation lowers. The Batteries having the low acceptance ratio of exhaust valve operation are those which have smaller areas of the second hole 5b located directly above the gas exhaust port. The cause of lowering the acceptance ratio can be seen to be that a passage having a maximum flow rate among the gas passages is blocked by the perforated plate. It is understood that the smaller the proportion of closing the maximum flow passage is, the higher the efficiency of exhausting gas is.

On the other hand, from the results of the observation of operation of exhaust valve for gas occurrence, it is understood that the acceptance ratio for exhaust valve normal operation abruptly lowers in the case where the perforated plate area ratio comes to be over 50%. By disassembling and observing the questioned batteries AG and BG, it is ascertained that the perforated plates deformed, consequently closing the passage connecting the electrode group and the exhaust valve.

In the case where the perforated plate G having a perforated plate area ratio of over 50% was used in the electrode groups A and B, the acceptance ratio is seen to lower considerably. Particularly, the acceptance ratio of the battery BG using the electrode group B is seen to be extremely low. The cause for this can be seen to lie on the differences in the gas occurrence way which were observed from the batteries AD and BD. Specifically, the lithium-nickel composite oxide used for the electrode group B is likely to cause a greater quantity of occurring gas after thermal decomposition thereof. Accordingly, the use of a perforated plate having an unsuitable perforated plate area ratio causes the problem to become prominent. Accordingly, it will be understood that in the case where an electrochemical element is a nonaqueous electrolytic secondary battery using a lithium-nickel composite oxide as an active material for the positive electrode, the advantageous effect of a suitable perforated plate is prominently exhibited.

The embodiment will be summarized.

(1) In the present embodiment, because the area of the perforated plate excluding the holes is 20 to 50% of the area of the opening of the casing, the perforated plate can be prevented from being broken even when impact due to drop is applied thereto, and the exhaust of the occurring gas through the holes can be suitably performed.

(2) The exhaust valve may be provided on the sealing member.

(3) The perforated plate may be adapted for electrically insulating the electrode group from the sealing member. In this construction, because no other insulating member is required than the perforated plate, the number of components can be reduced.

(4) The perforated plate may be adapted for electrically insulating the electrode group from the casing.

(5) The perforated plate may be made of a hard insulating material.

(6) The perforated plate may be a metal plate provided with an insulating material on at least one surface thereof. In this construction, a perforated plate having the sufficient strength and insulating characteristic can be produced at the reduced costs.

(7) A lithium-nickel composite oxide may be used as an active material for the positive electrode. In this construction, even in the case where a lithium-nickel composite oxide which is likely to cause a large quantity of gas is used as an active material for the positive electrode, the release of gas through the exhaust valve can be suitably performed by regulating the area of the holes of the perforated plate.

(8) The electrode group may have a roll structure.

(9) The electrode group may have a gap for allowing occurring gas to pass, and an opening area ratio (S0−S1)/S0 may be preferably 0.45 or more, where S0 denotes an area of the gap in the view from the exhaust valve, and S1 denotes an area in which the gap is closed by the perforated plate in the view from the exhaust valve. This construction can eliminate the likelihood that the perforated plate blocks the flow of occurring gas.

(10) The electrode group may have a gas exhausting member having an inner hole for allowing occurring gas to pass, an opening area ratio (S2−S3)/S2 may be preferably 0.3 or more, where S2 denotes an area of the inner hole in the view from the exhaust valve, and S3 denotes an area in which the inner hole is closed by the perforated plate in the view from the exhaust valve. This construction can eliminate the likelihood that the perforated plate blocks the flow of occurring gas.

(11) It may be preferable that the perforated plate has a protrusion on a periphery of the hole for closing a part of the inner hole of the gas exhausting member in the view from the exhaust valve. In this construction, while allowing occurring gas to be exhausted through the hole of the perforated plate, the protrusion can keep the gas exhausting member from going out due to impact or exhausting gas.

As described above, in accordance with the present embodiment, it is possible to provide an electrochemical element in which an exhaust valve is capable of smoothly operating even when gas is rapidly occurring inside a casing when an accident happens, and which has a reliable electrical insulation and high energy density.

INDUSTRIAL APPLICABILITY

The present invention can provide an electrochemical element which is excellent in safety at high temperature, and has a reliable electrical insulation and high energy density, and thus have the high industrial applicability, and the considerably significant advantageous effects.

The invention claimed is:

1. An electrochemical element in which an electrode group including a positive electrode, a negative electrode, and a separator placed between them is housed in a casing having an opening, and in which the opening of the casing is sealed with a sealing member, the electrochemical element comprising:
   an exhaust valve that operates when an internal pressure in the casing reaches a predetermined pressure, thereby releasing gas occurring in the casing to the outside; and
   a perforated plate having at least one hole and provided between the electrode group and the exhaust valve, an area of the perforated plate excluding the at least one hole being 20% or more and 50% or less of an area of the opening.

2. The electrochemical element according to claim 1, wherein the exhaust valve is provided on the sealing member.

3. The electrochemical element according to claim 2, wherein the perforated plate is adapted for electrically insulating the electrode group from the sealing member.

4. The electrochemical element according to claim 1, wherein the perforated plate is adapted for electrically insulating the electrode group from the casing.

5. The electrochemical element according to claim 4 wherein the perforated plate is made of a hard insulating material.

6. The electrochemical element according to claim 4 wherein the perforated plate is a metal plate provided with an insulating material on at least one surface thereof.

7. The electrochemical element according to claim 1, wherein a lithium-nickel composite oxide is used as an active material for the positive electrode.

8. The electrochemical element according to claim 1, wherein the electrode group has a roll structure.

9. The electrochemical element according to claim 1, wherein the electrode group has a gap for allowing occurring gas to pass, and an opening area ratio (S0−S1)/S0 is 0.45 or more, where S0 denotes an area of the gap in the view from the exhaust valve, and S1 denotes an area in which the gap is closed by the perforated plate in the view from the exhaust valve.

10. The electrochemical element according to claim 1, wherein the electrode group has a gas exhausting member having an inner hole for allowing occurring gas to pass, an opening area ratio (S2−S3)/S2 is 0.3 or more, where S2 denotes an area of the inner hole in the view from the exhaust valve, and S3 denotes an area in which the inner hole is closed by the perforated plate in the view from the exhaust valve.

11. The electrochemical element according to claim 10, wherein the perforated plate has a protrusion on a periphery of the at least one hole for closing a part of the inner hole of the gas exhausting member in the view from the exhaust valve.

12. The electrochemical element according to claim 3, wherein the perforated plate is made of a hard insulating material.

13. The electrochemical element according to claim 3, wherein the perforated plate is a metal plate provided with an insulating material on at least one surface thereof.

* * * * *